United States Patent [19]

Kage

[11] 4,425,548

[45] Jan. 10, 1984

[54] DIGITAL SIGNAL PROCESSING CIRCUIT

[75] Inventor: Kouzou Kage, Tokyo, Japan

[73] Assignee: Nippon Electric Company, Ltd., Tokyo, Japan

[21] Appl. No.: 300,346

[22] Filed: Sep. 8, 1981

[30] Foreign Application Priority Data

Sep. 9, 1980 [JP] Japan .................................. 55-123990

[51] Int. Cl.³ .......................................... H03K 13/32
[52] U.S. Cl. .................................. 328/162; 328/149; 307/359; 307/553
[58] Field of Search ............... 307/358, 359, 553, 552; 328/164, 162, 146, 149

[56] References Cited

U.S. PATENT DOCUMENTS

| | | | |
|---|---|---|---|
| 3,459,964 | 8/1969 | Yoshida et al. | 307/358 |
| 3,588,714 | 6/1971 | McIntosh | 328/164 |
| 4,145,743 | 3/1979 | Di Ciurcio | 307/359 |
| 4,375,037 | 2/1983 | Ikushima | 328/164 |

Primary Examiner—John S. Heyman
Attorney, Agent, or Firm—Sughrue, Mion, Zinn, Macpeak & Seas

[57] ABSTRACT

A digital data signal is distorted by means of a low or high pass filter. Quantization of such a signal in accordance with extracted clock pulses will result in a high error rate if a fixed quantization level is utilized due to attenuated voltage swings and a low differential between the signal excursions and the quantization level. The present invention overcomes this problem by means of a shift register connected to an output of a quantization comparator which is clocked by the extracted clock pulses. A weighting circuit is connected between the shift register and one of the inputs of the comparator to suitably adjust the relative quantization level to compensate for the asymmetrical voltage swings caused by the filtering and thereby greatly reduce the data error rate.

10 Claims, 10 Drawing Figures

FIG. 1 PRIOR ART
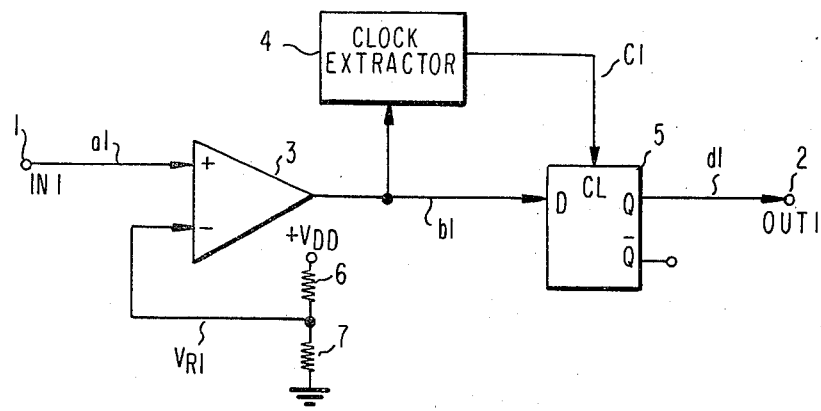
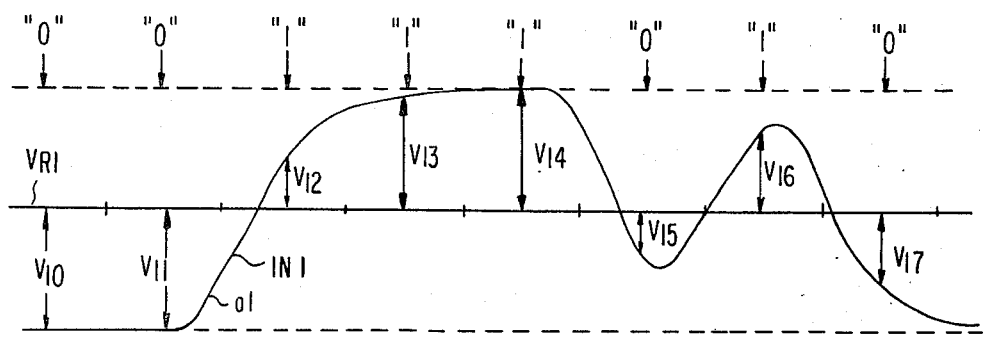
FIG. 2a
FIG. 2b
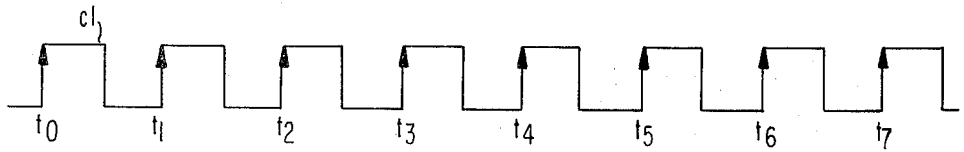
FIG. 2c
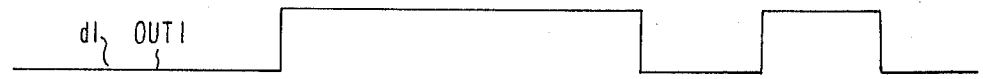
FIG. 2d
PRIOR ART

DIGITAL SIGNAL PROCESSING CIRCUIT

BACKGROUND OF THE INVENTION

The present invention relates to a circuit for processing or reconstructing digital data signals which have been distorted or bandwidth-restricted as a result of being subjected to high- or low-pass filtering.

The necessity of minimizing bandwidth is well known to those of skill in the art of digital data transmission. Numerous schemes have been proposed to achieve minimal bandwidth such as the partial-response filtering process disclosed in U.S. Pat. No. 3,845,412. In such a system, the signals are fed through a low- or high-pass filter. Although this results in a major reduction in bandwidth, it also results in considerable distortion of the digital signal such that a processing circuit is necessary to restore the signal to its original form.

In partial-response filtering, the bandwidth is constrained so that in one clock period the amplitude of modulation can change only by approximately one-half the total amplitude swing. This makes it necessary to provide circuitry to extract the clock pulses from the transmitted signal for switching purposes. Also, a reference voltage must be generated for quantization of the compressed signal.

In addition to the above, the filtering process results in a highly asymmetrical transmitted signal. If low-pass filtering is employed, a consecutive string of logic "1" or "0" bits will produce an increasing voltage swing away from the quantization level. In other words, the first bit of the string will not produce full amplitude swing. The opposite problem is produced in high-pass filtering since the initial amplitude swing for the first bit of the string will be maximum and then decrease for the consecutive bits. The result in either case is a varying differential between the signal level and the quantization level. Where the differential is low, the chance for erroneous quantization and data error is high.

The data error rate is high where the quantization voltage level is fixed. The above-mentioned U.S. Patent utilizes a system in which the quantization or reference level is generated by passing the data signal through a low-pass filter. This has the effect of producing a time average of the signal. However, the time constant of such a circuit must necessarily be relatively long, and for this reason the approach of the above-mentioned prior patent is cannot compensate for a highly asymmetrically distorted signal where the amount of distortion varies on a bit-by-bit basis.

SUMMARY OF THE INVENTION

It is an object of the present invention to provide a data signal processing circuit comprising means for in which the error rate in transmission of digital data signals distorted or bandwidth-restricted as a result of being subjected to high- or low-pass filtering is greatly reduced.

A digital signal processing circuit embodying the present invention comprises reference voltage generator means for generating a reference voltage, comparator means having a first input receiving the reference voltage and a second input receiving a digital signal which is distorted in a known manner, shift register means connected to an output of the comparator means, clock pulse extractor means for extracting clock pulses from the digital signal and applying the clock pulses to the shift register means, and weighting circuit means connected between the shift register means and a predetermined one of the first and second inputs of the comparator means, the weighting circuit means being constructed and operating in accordance with a predetermined function of the known manner of distortion of the digital signal.

In accordance with the present invention, a digital data signal is distorted by means of a low- or a high-pass filter in order to attain in a high level of bandwidth compression. The application of such compression in accordance with partial-response filtering tends to constrain the bandwidth so narrowly that in one clock period the amplitude of modulation can change only by approximately one-half the total amplitude swing. A string of logic "1" or "0" bits in this situation will result in a highly asymmetrical signal due to the distortion introduced by the filtering. Quantization of the signal in accordance with extracted clock pulses will result in a high error rate if a fixed quantization level is utilized due to attenuated voltage swings and a low differential between the signal excursions and the quantization level. The present invention overcomes this problem by means of a shift register connected to an output of a quantization comparator which is clocked by the extracted clock pulses. A weighting circuit is connected between the shift register and one of the inputs of the comparator to suitably adjust the relative quantization level to compensate for the asymmetrical voltage swings caused by the filtering and thereby greatly reduce the data error rate.

Other objects, together with the foregoing, are attained in the embodiments described in the following description and illustrated in the accompanying drawings.

BRIEF DESCRIPTION OF THE DRAWING

FIG. 1 is a schematic diagram of a prior art digital signal processing circuit;

FIGS. 2a to 2d constitute a timing diagram of the circuit of FIG. 1;

DESCRIPTION OF THE PREFERRED EMBODIMENTS

Figure 3:
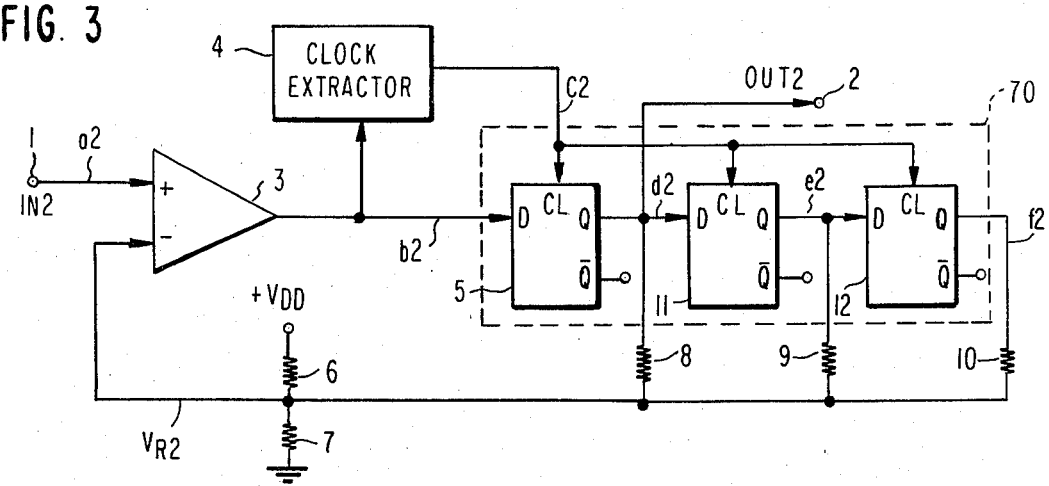
FIG. 3 is a schematic diagram of a first digital signal processing circuit embodying the present invention.
Figure 4A:
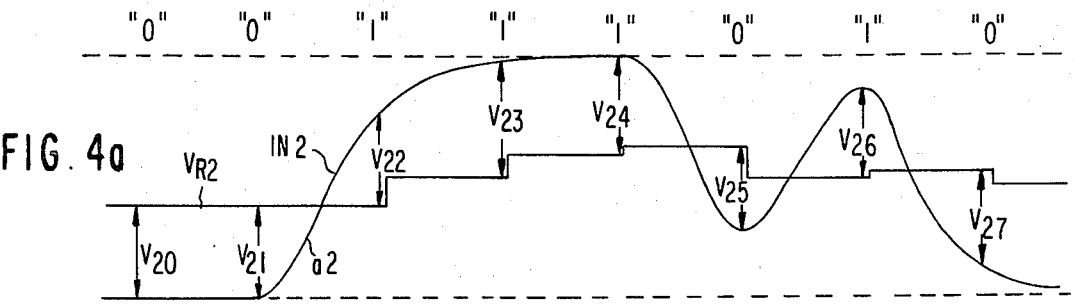
FIGS. 4a to 4f constitute a timing diagram of the circuit of FIG. 3.
Figure 4B:
Figure 4C:
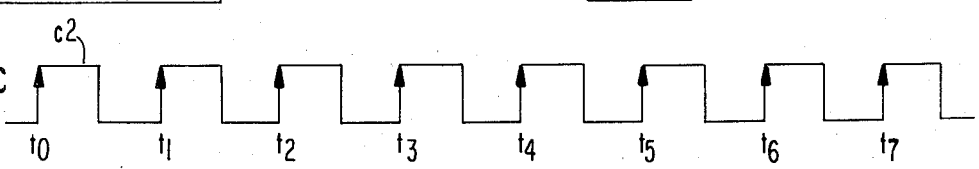
Figure 4D:
Figure 4E:
Figure 4F:

While the digital signal processing circuit of the present invention is susceptible of numerous physical embodiments, depending upon the environment and requirements of use, substantial numbers of the herein shown and described embodiments have been made, tested and used, and all have performed in an eminently satisfactory manner.

Referring now to FIG. 1, a prior art digital signal processing circuit includes a voltage comparator 3. A digital data input signal, designated as IN 1, at point a1 is applied from a terminal 1 to a noninverting input of the comparator 3. Resistors 6 and 7 are connected in series between a positive D.C. source $+V_{DD}$ and ground and constitute a reference voltage generator. A voltage divided reference voltage $V_{R1}$ appears at the junction of the resistors 6 and 7 and is applied to an inverting input of the comparator 3.

The output of the comparator 3, designated as b1, is connected to a D input of a D-type flip-flop 5. An output signal, designated as OUT 1, at point d1 is applied from a Q output of the flip-flop 5 to a terminal 2.

A clock pulse extractor 4 is connected between the output of the comparator 3 and a clock input of the flip-flop 5. The detailed construction of such an extractor or clock pulse recovery circuit 4 is known in the art and an example thereof is disclosed, for example, in the above-mentioned U.S. Pat. No. 3,845,412 or alternatively U.S. Pat. No. 4,087,627, both of those prior patents being incorporated herein by reference.

The signals at points a1 to d1 are illustrated in FIGS. 2a to 2d respectively. The input signal IN 1 is a digital data signal which is distorted by being passed through a low-pass filter. The bandwidth of the input signal a1 is constrained thereby to such an extent that in one clock period the modulation can change only by one-half the total possible amplitude swing.

The clock pulses may be extracted from the data signal or the output of the comparator 3 since the input signal IN 1 will cross the quantization level at precisely the instant that the clock signal changes states. The extractor 4 is implemented with a clock pulse generator (not shown) which is synchronized with the input signal IN 1 by the quantization level crossovers. The extracted clock pulses are designated as c1 and appear in FIG. 2c. The leading edges of the clock pulses applied to the flip-flop 5 trigger the same. The output clock pulses of the extractor 4 are timed to appear at the midpoints of the data bits of the input signal, or when the signal-to-noise ratio is maximum. A logic "1" will be set into the flip-flop 5 at the leading edges of the clock pulses if the output of the comparator 3 is a logic "1" and vice-versa. The output of the comparator 3 will be a logic "1" if the amplitude of the input signal IN 1 is larger than that of the reference or quantization voltage $V_{R1}$ and vice-versa.

The illustrated input signal IN 1 corresponds to data bits "00111010". The clock pulses are shown as having their leading edges occurring at times t0 to t7 with the corresponding amplitude or magnitude of the data signal being $V_{10}$ to $V_{17}$, respectively. Maximum and minimum signal amplitudes represent logic "1" and "0" respectively. The output signal OUT 1 constitutes a clean version of the input signal IN 1.

The problem involved in the prior art is clearly illustrated in FIG. 2a. The input data signal a1 in this case was fed through a very narrow bandwidth low-pass filter. It will be seen that the signal is not a clean square wave, but increases in amplitude swing in proportion to the number of bits in a string of logic "1" or "0" bits. It will be noted that the voltage $V_{12}$ corresponding to the first logic "1" bit has a magnitude only slightly above the voltage level $V_{R1}$. Also, the voltage $V_{15}$ of the first logic "0" bit following the string of three logic "1" bits is only slightly below the voltage level $V_{R1}$. This small differential between the input and reference or quantization voltages results in a very high data error rate in the prior art system illustrated which utilizes a fixed quantization voltage due to the asymmetry of the input signal due to the low-pass filtering.

Throughout the drawing figures which will be described hereinbelow, like elements will be designated by the same reference numerals, and in some cases corresponding elements will be designated by the same reference characters with the suffix numerals changed. The character and numeral combinations designating the signal points in each case correspond to the drawing figures in the corresponding timing diagrams and are unique.

Referring now to FIG. 3, a data signal processing circuit is illustrated which includes novel and unique means for obviating the problem discussed hereinabove with reference to the prior art. In addition to the elements of FIG. 1, the present circuit is provided with a shift register 70 of which the flip-flop 5 constitutes a first stage. Second and third stages are provided by D-type flip-flops 11 and 12 connected in cascade. The flip-flops 5, 11 and 12 are clocked simultaneously by the extractor 4 so that the signal level at the D input of each flip-flop 5, 11 and 12 is applied thereto from the previous stage at the leading edge of the corresponding clock pulse. The signals at points a2 to f2 are illustrated in FIGS. 4a to 4f, respectively.

The circuit of FIG. 3 further includes a resistor weighting circuit composed of resistors 8, 9 and 10 which are connected between the Q outputs of the flip-flops 5, 11 and 12, respectively, and the non-inverting input of the comparator 3. The resistors 8, 9 and 10 function to sum the output levels of the flip-flops 5, 11 and 12 with the reference voltage at the inverting input of the comparator 3. The flip-flop 5 will contain the present data bit whereas the flip-flops 11 and 12 will contain the previous two data bits respectively. The output signal OUT 2 (d2) of the circuit appears at 2 the terminal 2.

The register 70 is capable of producing four discrete output levels depending on the contents thereof. When the Q outputs of all of the flip-flops 5, 11 and 12 are logically low, the output of the weighting circuit 8, 9 and 10 will be minimum and the weighted voltage applied to the inverting input of the comparator 3 in at the junction of the resistors 6 and 7 will be minimum. Therefore, the reference voltage $V_{R2}$, which in accordance with the present invention is variable, is minimum. At the other extreme, when the outputs of the flip-flops 5, 11 and 12 are all high, the voltage $V_{R2}$ will be maximum. Thus, the voltages $V_{20}$ to $V_{27}$ increase as the magnitude of the signal IN 2 increases away from the reference or quantization voltage. It will become clear from the drawing that although the waveform of the signal IN 2 (a2) remains asymmetrical, the reference or quantization voltage $V_{R2}$ is automatically increased by a logic "1" bit and decreased by a logic "0" bit so as to be centered between the instantaneous high and low levels of the input signal IN 2 (a2). The desirable result of this operation is that the input signal, although distorted, is symmetrically superimposed on the quantization level. Thus, the differential between the signal level and the quantization level is maximized, greatly reducing the data error rate.

Naturally, the tracking of the input signal improves in proportion to the number of stages in the shift register 70. However, a single stage may suffice in certain low speed applications.

Figure 5:
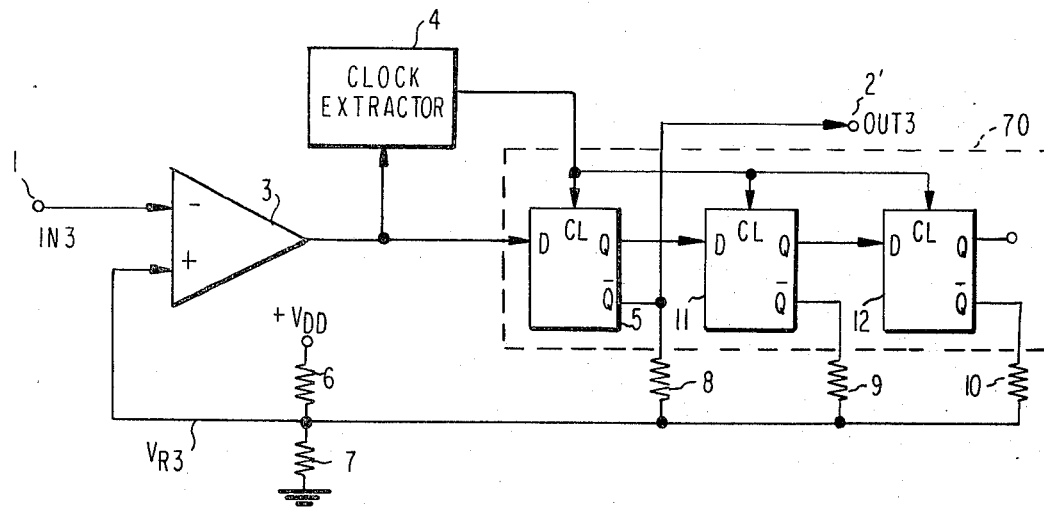
FIG. 5 is a schematic diagram of a second digital signal processing circuit embodying the present invention.

FIG. 5 shows a modified embodiment of the present invention in which the connections of the inputs of the comparator 3 are reversed. That is, input signal IN 3 is supplied to an inverting input of the comparator 3. The resulting inverted logic is compensated for merely by connecting the Q outputs of the shift registers 5, 11 and 12 to the junction of the resistors 6 and 7 through corresponding resistors 8, 9 and 10. The output voltage (OUT 3) of the circuit of FIG. 5 is the same as that of FIG. 3 since the output applied to the terminal 2' is taken from the Q ouput of the flip-flop 5.

It will be noted that the weighting function of the resistors 8, 9 and 10 as connected in FIG. 3 provides a non-inverting function whereas in FIG. 5 the weighting function is inverting. The values of the resistors 8, 9 and 10 are selected in accordance with a predetermined function of the manner in which the input signal is distorted, which is of course known to the designer of the system.

Figure 6:
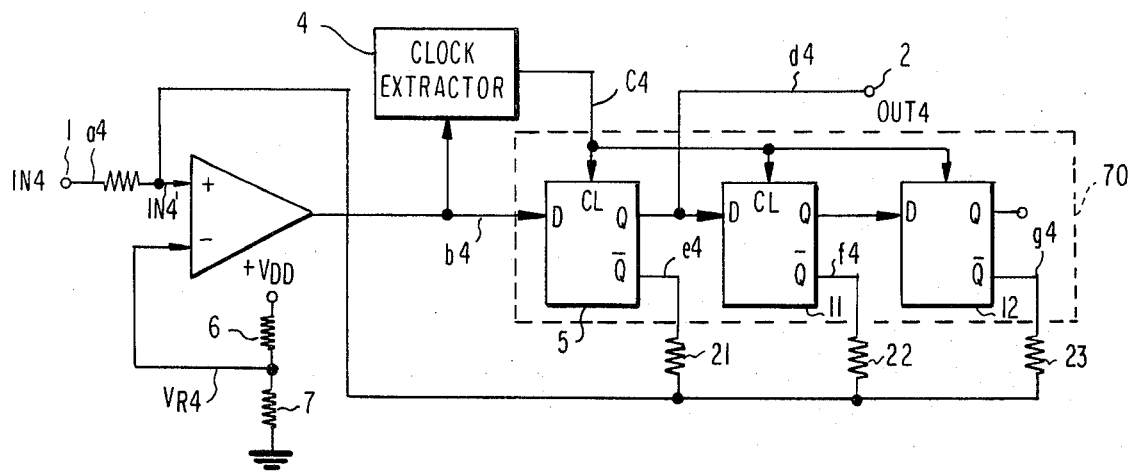
FIG. 6 is a electrical schematic diagram of a third digital processing embodying the present invention.

In FIGS. 3 and 5, the desired result in the low-pass filter mode is attained by increasing the reference voltage in response to a logic "1" bit. This shifts the reference voltage upward relative to the signal waveform. It will be understood that a functionally equivalent result may be obtained by shifting the waveform downward while maintaining the reference voltage constant in response to a logic "1" bit and vice-versa. This concept is embodied in the circuitry of FIG. 6. The signals at points a4 to g4 are illustrated in FIGS. 7a to 7g, respectively.

Figure 7A:
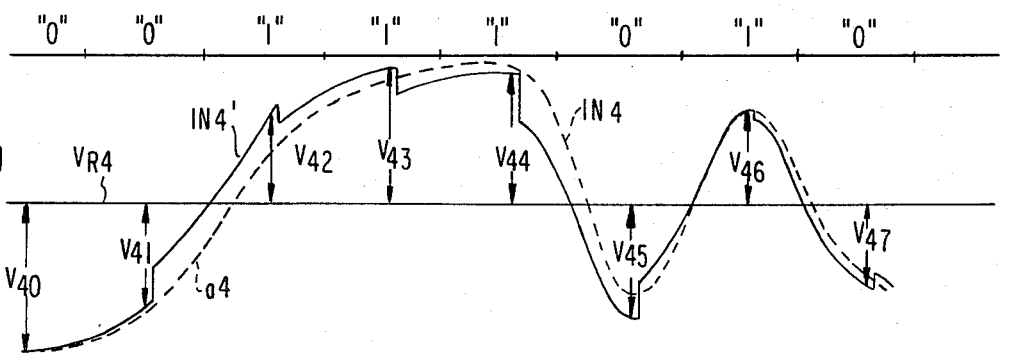
FIGS. 7a to 7g constitute a timing diagram of the circuit of FIG. 6.
Figure 7B:
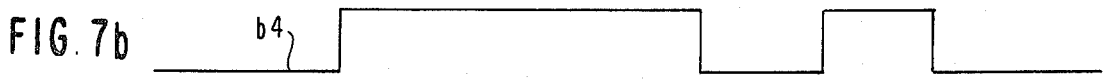
Figure 7C:
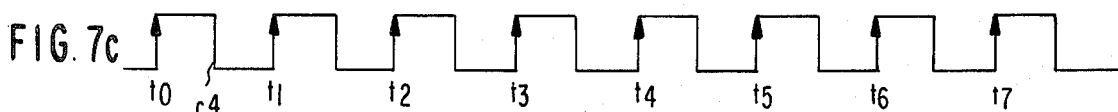
Figure 7D:
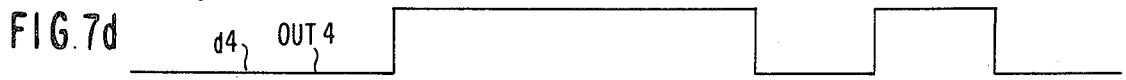
Figure 7E:
Figure 7F:
Figure 7G:
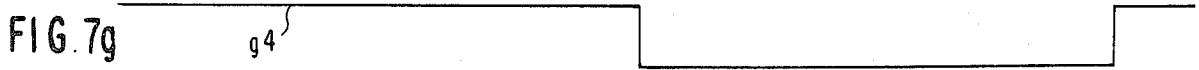

In this case, an inverting weighting function is achieved by connecting resistors 21, 22 and 23 between the Q outputs of the flip-flops 5, 11 and 12 and the non-inverting input of the comparator 3. Thus, the inverted outputs of the flip-flops 5, 11 and 12 are summed with the input signal IN 4 (a4) to produce an altered input signal IN 4' which is illustrated in FIG. 7a. The broken line curve represents the signal IN 4 whereas the solid line curve represents the summation of the signal IN 4 (a4) and the output of the weighting circuit. It will be noted that the desired effect is achieved since the level of the signal IN 4' is shifted downward relative to the fixed reference voltage $V_{R4}$ in response to a logic "1" bit and vice-versa as illustrated by voltages $V_{40}$ to $V_{47}$. The output signal OUT 4 (d4) is therefore the same as the output signal OUT 2 (d2).

Preferably, the values of the resistors 21, 22 and 23 are selected such that $R_{21} > R_{22} > R_{23}$ to provide the desired weighting function. However, the weighting values and the selection of inverting or non-inverting weighting is freely variable within the scope of the present invention in accordance with the manner in which the data signal is distorted by the bandwidth compression.

Figure 8:
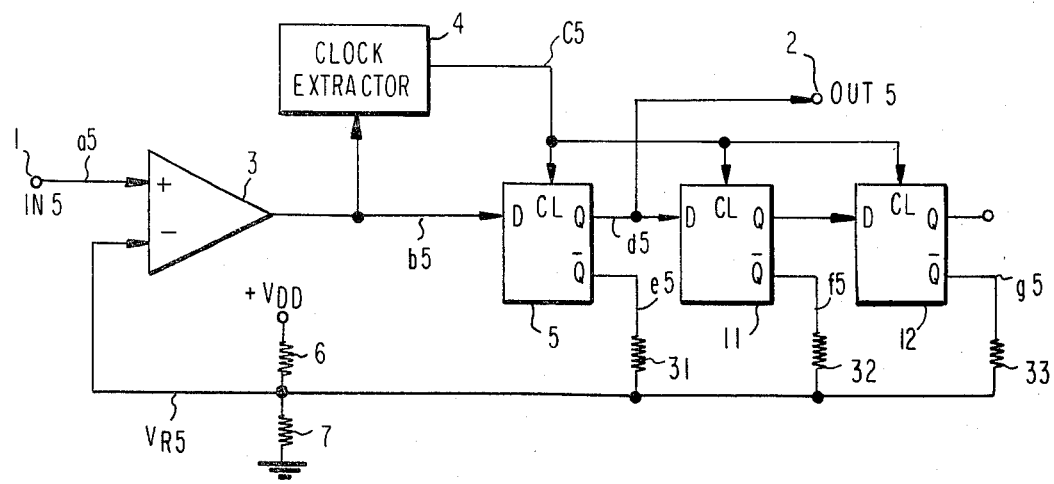
FIG. 8 shows a schematic diagram of a fourth digital processing circuit embodying the present invention.
Figure 9A:
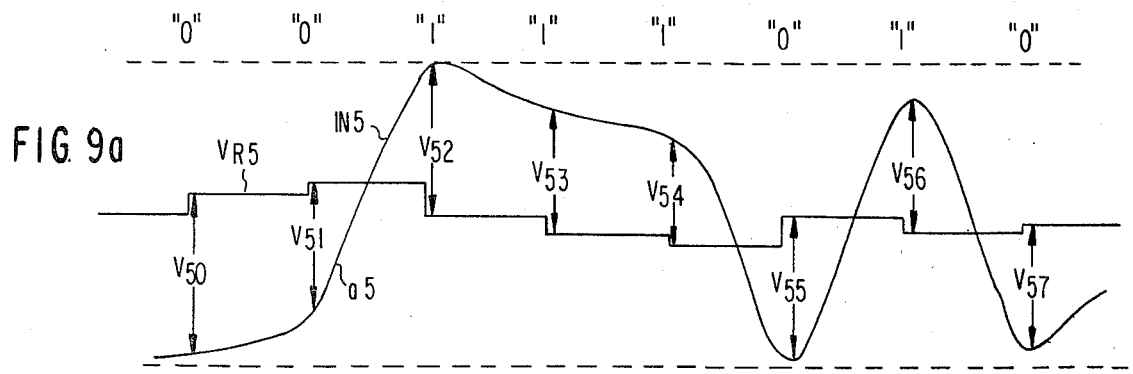
FIGS. 9a to 9g constitute a timing diagram for the circuit of FIG. 8.
Figure 9B:
Figure 9C:
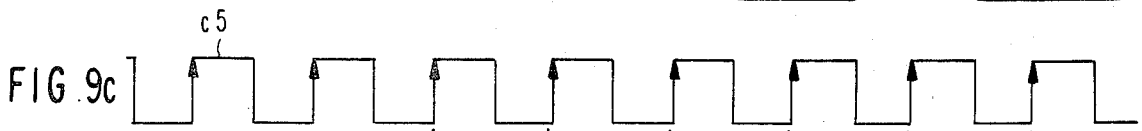
Figure 9D:
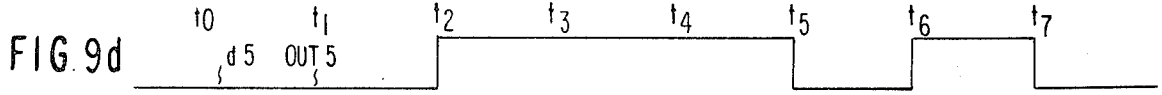
Figure 9E:
Figure 9F:
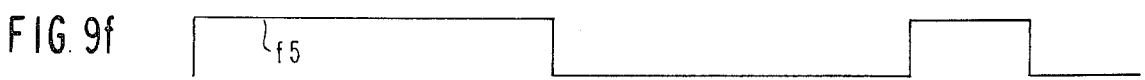
Figure 9G:

FIG. 8 illustrates another embodiment of the invention in which the input data signal is passed through a high-pass filter rather than a low-pass filter. The distortion of the waveform in FIG. 9a is opposite to that of the low-pass filter. It will be seen that the waveform decreases in amplitude excursion toward the reference level as a function of time in response to a string of "1" or "0" bits.

In order to maintain the desired differential between the input signal level IN 5 (a5) and the reference or quantization voltage level $V_{R5}$, the reference voltage correction or adjustment must be opposite to the case for a low-pass filter. In other words, the reference voltage $V_{R5}$ should be reduced in response to a "1" data bit and vice-versa. A comparison of FIGS. 8 and 3 will show that this function is provided merely by connecting the Q outputs of the flip-flops 5, 11 and 12 to the junction of the resistors 6 and 7 through resistors 31, 32 and 33. The result is an inverting weighting function rather than a non-inverting weighting function which compensates for the distortion of the high pass filter. The signals at points a5 to g5 are illustrated in FIGS. 9a to 9g, respectively. The output signal OUT 5 appears at the terminal 2. The voltages $V_{50}$ to $V_{57}$ represent the differential voltages between the input signal levels and the reference level at the sampling points t0 to t7, respectively.

Figure 10:
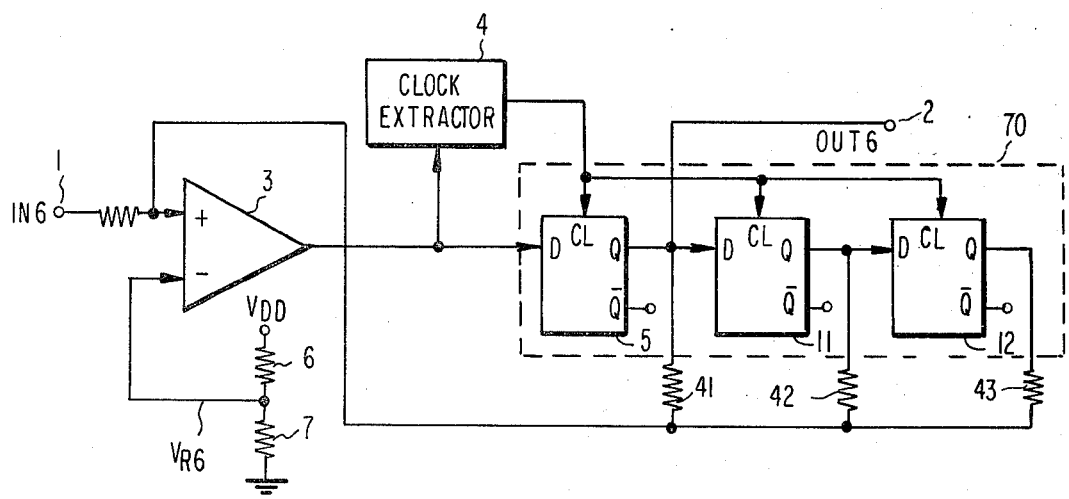
FIG. 10 is a schematic diagram of a fifth digital processing circuit embodying the present invention.

FIG. 10 shows how the same result as in FIG. 8 may be obtained by providing a non-inverting weighting function via resistors 41, 42 and 43 and applying the weighted correction voltage to the non-inverting input of the comparator 3. The result is functionally equivalent to that of FIG. 8 and functionally opposite to that of FIG. 6.

In summary, it will be seen that the present invention overcomes the drawbacks of the prior art and greatly reduces the error rate in narrow bandwidth transmission of data signals by providing a feedback weighting arrangement. In addition, since the stored comparator outputs are fed back to the comparator input, any undesirable noise which may be present on the input data at times other than those at which occurs signal extraction (or sampling) does not affect the comparator input. This also reduces the data error rate. Various modifications will become apparent to those skilled in the art after receiving the teachings of the present disclosure without departing from the scope thereof.

What is claimed is:

1. A digital signal processing circuit comprising:
   reference voltage generator means for generating a reference voltage;
   comparator means having a first input for receiving said reference voltage and a second input for receiving a digital signal which is distorted in a known manner;
   shift register means connected to an output of the comparator means;
   clock pulse extractor means for extracting clock pulses from said digital signal and applying the clock pulses to the shift register means; and
   weighing circuit means connected between the shift register means and a predetermined one of the first and second inputs of said comparator means, said weighting circuit means having an operating characteristic determined in accordance with an output of said shift register means which in turn operates as a function of said digital signal, whereby reference voltage changes are made at said comparator input to offset any adverse effect of said known digital input signal distortion.

2. A digital signal processing circuit as in claim 1, in which said weighting circuit means is connected to said first input.

3. A digital signal processing circuit as in claim 2, in which said operating characteristic of said weighting circuit means is such that an output of said weighting circuit means applied to said first input is a non-inverting function of an amplitude characteristic of said digital signal.

4. A digital signal processing circuit as in claim 2, in which said operating characteristic of said weighting circuit means is such that an output of said weighting circuit means applied to said first input is an inverting function of an amplitude characteristic of said digital signal.

5. A digital signal processing circuit as in claim 1, in which said weighting circuit means is connected to said second input.

6. A digital signal processing circuit as in claim 5, in which said operating characteristic of said weighting circuit means is such that an output of said weighting circuit means applied to said second input is a non-inverting function of an amplitude characteristic of said digital signal.

7. A digital signal processing circuit as in claim 5, in which said operating characteristic of said weighting circuit means is such that an output of said weighting circuit means applied to said second input is an inverting function of an amplitude characteristic of said digital signal.

8. A digital signal processing circuit as in claim 1, in which said weighting circuit means comprises at least one weighting resistor.

9. A digital signal processing circuit as in claim 1, in which said shift register means comprises a plurality of stages.

10. A digital signal processing circuit as in claim 9, in which said weighting circuit means comprises a plurality of weighting resistors connected between said predetermined one of the first and second inputs of the comparator means and outputs of respective stages of said shift register means.

* * * * *

UNITED STATES PATENT AND TRADEMARK OFFICE
CERTIFICATE OF CORRECTION

PATENT NO. : 4,425,548

DATED : January 10, 1984

INVENTOR(S) : Kouzou Kage

It is certified that error appears in the above-identified patent and that said Letters Patent is hereby corrected as shown below:

Column 1, line 48, after "patent" delete "is";

line 54, after "circuit", delete "comprising means for".

Column 2, line 8, after "or", delete "a".

Column 4, line 38, after "at", delete "2";

line 45, after "3", delete "in".

Column 5, line 6, after "outputs", change "Q" to --$\overline{Q}$--;

line 11, after "the" (first occurrence), change "Q" to --$\overline{Q}$ output--;

UNITED STATES PATENT AND TRADEMARK OFFICE
CERTIFICATE OF CORRECTION

PATENT NO. : 4,425,548

DATED : January 10, 1984

INVENTOR(S) : Kouzou Kage

It is certified that error appears in the above-identified patent and that said Letters Patent is hereby corrected as shown below:

line 33, before "outputs", change "Q" to --$\overline{Q}$--.

Column 6, line 3, before "outputs", change "Q" to --$\overline{Q}$--.

Signed and Sealed this

Twenty-second Day of May 1984

[SEAL]

Attest:

GERALD J. MOSSINGHOFF

Attesting Officer     Commissioner of Patents and Trademarks